United States Patent
Verma et al.

(10) Patent No.: US 10,454,761 B2
(45) Date of Patent: Oct. 22, 2019

(54) MIGRATION OF MANAGED DEVICES TO UTILIZE MANAGEMENT PLATFORM FEATURES

(71) Applicant: VMware, Inc., Palo Alto, CA (US)

(72) Inventors: Gaurav Verma, Bangalore (IN); Suchit Shivashankar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 151 days.

(21) Appl. No.: 15/583,602

(22) Filed: May 1, 2017

(65) Prior Publication Data
US 2018/0316574 A1    Nov. 1, 2018

(51) Int. Cl.
| | |
|---|---|
| *G06F 15/177* | (2006.01) |
| *H04L 12/24* | (2006.01) |
| *H04L 29/08* | (2006.01) |
| *H04W 4/50* | (2018.01) |
| *H04L 29/06* | (2006.01) |

(52) U.S. Cl.
CPC ...... *H04L 41/0806* (2013.01); *H04L 41/5054* (2013.01); *H04L 67/303* (2013.01); *H04L 67/34* (2013.01); *H04W 4/50* (2018.02); *H04L 41/0859* (2013.01); *H04L 67/42* (2013.01)

(58) Field of Classification Search
CPC . H04L 41/0806; H04L 41/0859; H04L 41/22; H04L 41/5054; H04L 67/303; H04L 67/34; H04L 67/42
See application file for complete search history.

(56) References Cited

U.S. PATENT DOCUMENTS

| | | | | |
|---|---|---|---|---|
| 8,613,070 | B1* | 12/2013 | Borzycki | G06F 21/6218 726/8 |
| 8,887,230 | B2* | 11/2014 | Barton | H04L 41/046 726/1 |
| 2002/0111972 | A1* | 8/2002 | Lynch | G06F 3/14 715/236 |
| 2015/0188777 | A1* | 7/2015 | Frost | H04L 67/34 709/223 |
| 2015/0319226 | A1* | 11/2015 | Mahmood | H04L 43/0817 709/201 |
| 2017/0102930 | A1* | 4/2017 | Sawaya | G06F 8/61 |
| 2018/0145877 | A1* | 5/2018 | Ramesh | H04L 67/02 |
| 2018/0146046 | A1* | 5/2018 | Deane | H04L 63/20 |

* cited by examiner

*Primary Examiner* — June Y Sison
*Assistant Examiner* — Dixon F Dabipi
(74) *Attorney, Agent, or Firm* — Thomas Horstemeyer, LLP

(57) ABSTRACT

Disclosed are various examples for client device migration to utilize management platform features. In one example, the client device is enrolled with a management service. Enterprise status data is requested and received from a client device. The status data indicates that the client device is compatible with a management platform. An indication that migration is accepted is received from the client device. A previous management profile is uninstalled on the client device. A device record that is compatible with the management platform is created. A management profile that is compatible with the management platform is installed on the client device.

20 Claims, 6 Drawing Sheets

MIGRATION OF MANAGED DEVICES TO UTILIZE MANAGEMENT PLATFORM FEATURES

BACKGROUND

An enterprise can use a management service capable of protecting enterprise data like email and corporate documents, from theft, data loss, and unauthorized access. The enterprise can require devices used by employees to be enrolled with the management service to protect enterprise data. These managed devices can include enterprise-owned devices and bring-your-own-device (BYOD) technologies. With the emerging use of BYOD technologies by enterprises, management systems are increasingly likely to require support for a variety of devices and a variety of platforms. Platforms that include features or options directed to supporting both enterprise use and personal use can be referred to as management platforms. Management platforms include versions of GOOGLE® Android. When used in an enterprise setting, GOOGLE® Android can be referred to as "Android enterprise" or "Android in the enterprise."

Migrating the managed devices to utilize management platform features can be difficult. Devices that are in use by an enterprise may include management platform devices that use management platforms or otherwise support management platform features. Other devices that are in use by an enterprise may not support enterprise features. Users may not know whether their device is a management platform device. Existing management systems may require un-enrollment and a full enrollment process in order to utilize the management platform features. Administrators capable of migrating the devices are often not in possession of the devices. Training the users of the devices to perform this migration process can be a significant burden to administrators. The migration process for management platform devices to utilize management platform features can be frustrating for IT professionals and users alike.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to migration of client devices to utilize management platform features. Management platform features can include multilayered protection, application-level security, separation of enterprise data from personal data, management platform applications, and other features. An enterprise can use a management service capable of protecting enterprise data, like email and corporate documents, from theft, data loss, and unauthorized access. With the emerging use of BYOD technologies by enterprises, management systems are increasingly likely to require support for a variety of devices and a variety of platforms. Devices that are in use by an enterprise (i.e., managed devices) can include devices that use management platforms as well as devices that do not use management platforms. Migrating client devices to utilize management platform features can be difficult. Administrators capable of migrating the devices are often not in possession of the devices. Training the users of the devices to perform this migration process can be a significant burden to administrators. The migration process for client devices to utilize management platform features can be frustrating for IT professionals and users alike. However, examples described herein describe a migration service having mechanisms capable of guiding migration of client devices to utilize management platform features on the client devices.

Figure 1:
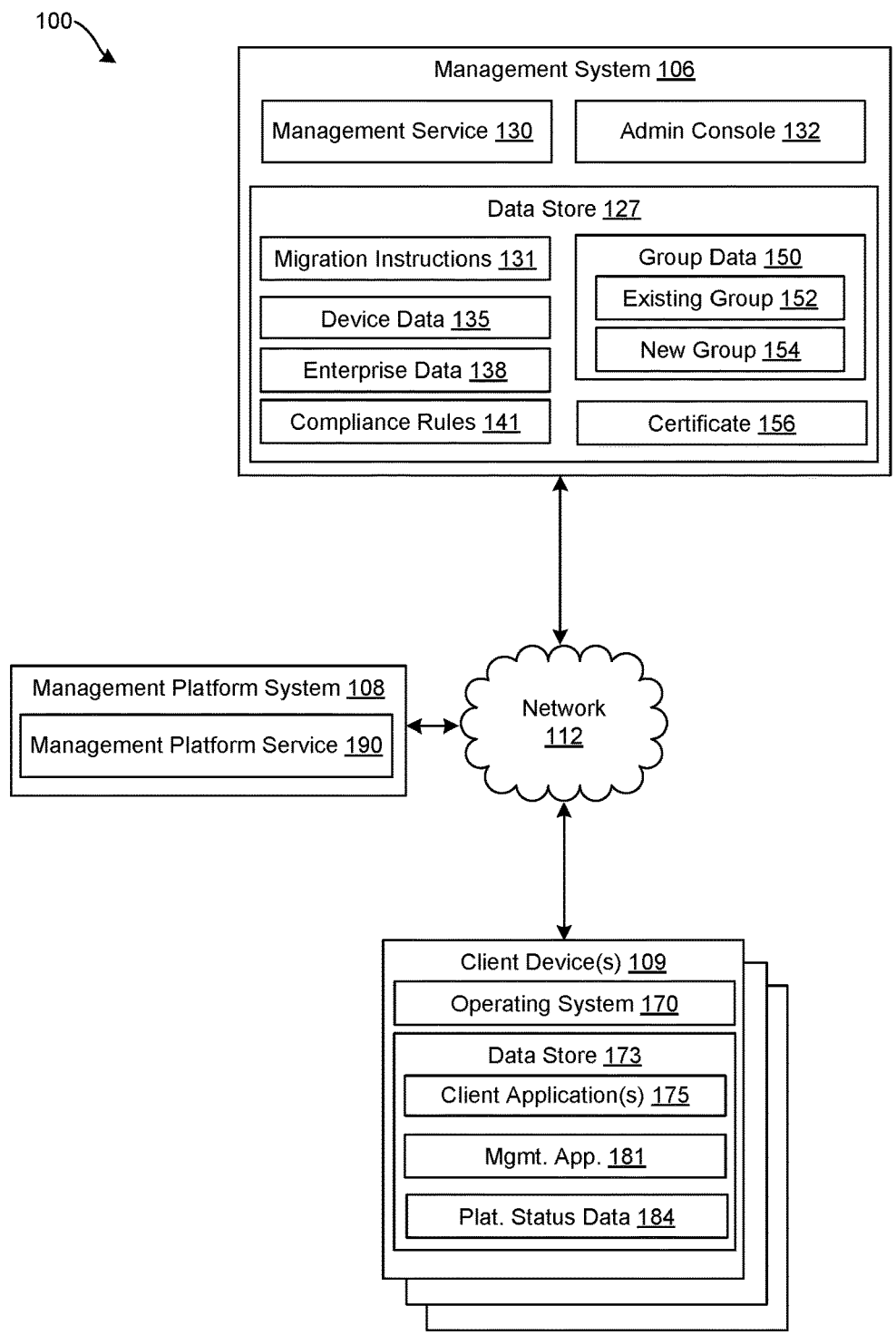
FIG. 1 is a drawing of an example of a networked environment including a management system, a management platform system, and a client device.

With reference to FIG. 1, shown is an example of a networked environment 100. The networked environment 100 can include a management system 106, a management platform system 108, and a client device 109 in communication with one another over a network 112. An enterprise can issue the client device 109 to a user, or the client device 109 can be provided by the user. The client device 109 can be currently enrolled with a management service 130 of the management system 106. The client device 109 can be representative of multiple client devices 109. The enterprise can decide to utilize management platform features on the client device(s) 109 that are management platform devices. In other words, the enterprise can decide to migrate client device(s) 109 within the management service 130 to utilize management platform features.

The network 112 can include, for example, the Internet, intranets, extranets, wide area networks (WANs), local area networks (LANs), wired networks, wireless networks, other suitable networks, or any combination of two or more networks. For example, the networks can include satellite networks, cable networks, Ethernet networks, telephony networks, and other types of networks.

The management system 106 can include, for example, a server computer or any other system providing computing capability. Alternatively, the management system 106 can include a plurality of computing devices that are arranged, for example, in one or more server banks, computer banks, or other arrangements. The management systems 106 can include a grid computing resource or any other distributed computing arrangement. The computing devices can be located in a single installation or can be distributed among many different geographical locations. The management systems 106 can also include or be operated as one or more virtualized computer instances. For purposes of convenience, the management system 106 is referred to herein in the singular. Even though the management system 106 is referred to in the singular, it is understood that a plurality of management systems 106 can be employed in the various arrangements as described above.

The management system 106 executes a management service 130 to oversee the management of the client devices 109. The data store 127 can store migration instructions 131. The migration instructions 131 can cause the management system 106 to migrate the client device(s) 109 within the management service 130 to utilize management platform features. The migration instructions 131 can be a subroutine of the management service 130, or can be an application, service, process, engine, or functionality independent from the management service 130. In some instances, the migration can include moving the client device 109 from the existing group 152 to the new group 154 within the management service 130 to utilize management platform features. The new group 154 can be unrelated to the existing group 152, or can be a sub group such as a sibling group or a child group of the (parent) existing group 152. In other situations, the migration does not involve changing an organizational group of the client device 109. The existing group 152 can support or be compatible with management platform features. The components executed on the management system 106 can include, for example, a management service 130 as well as other applications, services, processes, systems, engines, or functionality not discussed in detail herein. The management service 130 can provide functionality using application program interfaces (APIs), such as a Representational State Transfer (REST) API or an Identity Services Engine (ISE) API. The management service 130 can oversee the operation of client devices 109 enrolled with the management service 130 as well as manage enrollment and un-enrollment operations of the client devices 109. To this end, an API of the management service 130 can provide enrollment information regarding a client device 109, including data that indicates whether the client device 109 is enrolled with the management service 130. APIs or API calls can be provided for other functionalities of the management service as discussed herein.

The management service 130 can store, in the data store 127, a migration status for each client device 109. The migration status can include a flag that indicates whether the client device 109 is migrated or enabled within the management service 130 to utilize management platform features. The management service 130 can also store a management platform status or flag. The management platform status can indicate whether the client device 109 is a management platform device that supports or is compatible with the management platform or a management platform feature of the management platform. For example, the client device 109 can include an operating system or an application that is part of a management platform. The operating system or the application of the client device 109 can be compatible with management platform features like multilayered protection, application-level security, separation of enterprise data from personal data, and various management platform applications.

The management system 106 can execute a user interface such as an administrative console 132 through an application, web application, and/or network site for administration of the management service 130. The administrative console 132 can also provide for administration of the migration of client devices 109 within the management service 130 to utilize management platform features. The administrative console 132 can be considered part of the management service 130. The administrative console 132 can provide administrative access to migration status information for each of the client devices 109, along with user identifiers, email addresses, device identifiers, migration statuses, and management platform statuses. The management service 130 can include a user interface of the console that facilitates input or upload of a certificate 156 or another electronic credential to the management service 130. The certificate 156 can authenticate the management service 130 with a management platform service 190 of the management platform system 108 to allow the management service 130 to enable or support management platform features for a client device 109. An account with the management platform service 190 can be created for the client device 109. The account with the management platform service 190 can allow integration with the management service 130 to utilize management platform features like administrative preapproval of certain applications for enterprise purposes. For instance, a GOOGLE® service can allow Android enterprise features of client devices with Android enterprise versions of GOOGLE® Android operating system. One example of an account with a management platform service is a managed GOOGLE® Account. A managed Google Account can be an GOOGLE® account that allows integration with the management service 130. A managed GOOGLE® Account can be created for a client device 109 running an Android enterprise version of GOOGLE® Android operating system. A certificate 156 can authenticate the management service 130 with the GOOGLE® service and allow the management service 130 to enable or support Android enterprise features. The certificate 156 can be valid for a certain time period, after which it can expire.

The user interface of the console of the management service 130 can include an interface element that can, when activated, initiate migration of the client devices 109 to utilize management platform features. In some cases, the console can be accessed through a network site and a web application. The network site or web application can generate the user interface to be rendered on a device through a browser or another application. The device can include a computer, mobile device, smartphone, or like device. An enterprise, such as one or more companies, organizations, or individuals can operate the management service 130 to oversee or manage the operation of the client devices 109 of its employees, contractors, customers, students, or other users having accounts with the enterprise. An enterprise can be a customer of the management service 130.

An enterprise can utilize the management service 130 to oversee or manage the operation of the client devices 109 of its employees, contractors, customers, students, or other users having user accounts with the enterprise. The management service 130 can remotely configure the client device 109 by interacting with an agent application, a management application 181, or another client application 175 executed on the client device 109.

The management service 130 can transmit various software components to the client device 109, which are then installed or configured by the management application 181. Software components can include, for example, additional client applications 175, resources, libraries, drivers, device configurations, or other similar components that require installation on the client device 109 as specified by an administrator of the management service 130. The management service 130 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. Policies can be implemented by the management application 181.

The management service 130 can have a command queue storing at least one action to perform on the particular client device 109 upon check-in of the client device 109. For instance, the management application 181 can cause the client device 109 to check-in with the management service, identify an action in the command queue, and perform the action. An action can be the installation of a management profile, or the execution of a command or other actions to install software components or implement policies. A management profile can include a set of attributes, features, services, configurations, and settings that are associated with a device and/or a user. In some cases, the management application 181 can cause a check-in of the client device 109 periodically, on a schedule, or upon an event such as entering a physical location, changing a state of the client device 109, or installing an application on the client device 109. In one example, the contents of the command queue can include a command that the management application 181 causes to be executed on the client device 109. In another example, the contents of the command queue can include a resource or a client application 175 that the management application 181 causes to be installed on the client device 109, which the client device 109 may access through a specified uniform resource identifier (URI) or a uniform resource locator (URL).

Also, the management service 130 can request that the client device 109 check-in using a notification service like APPLE® Push Notification Service (APNS), GOOGLE® Cloud Messaging (GCM), or WINDOWS® Push Notification Services (WNS). For example, the management service 130 can transmit a request to the notification service requesting that the client device 109 check-in. The notification service can push or otherwise route a notification to the client device 109. Once the notification is received, the management application 181 can cause the client device 109 to check-in with the management service 130. As described above, the management application 181 can determine whether a command queue provided by the management service 130 for the respective client device 109 contains any commands or resources for the client device 109, and, if so, can cause the commands or resources to be downloaded and/or implemented on the client device 109.

The data store 127 can include memory of the management system 106, mass storage resources of the management system 106, or any other storage resources on which data can be stored by the management system 106. The data stored in the data store 127 can include, for example, the management service 130, migration instructions 131, device data 135, enterprise data 138, compliance rules 141, enrollment data 144, group data 150, and other data.

Generally, device data 135 includes data associated with a configuration of a client device 109 enrolled or managed by the management service 130. The device data can include an identifier of the client device 109. The identifier can be a serial number, media access control (MAC) address, other network address, or another device identifier. Device data 135 can also include data pertaining to a user of each client device 109. In addition, the device data 135 can include an enrollment status indicating whether a client device 109 has been enrolled with the management service 130. In one example, a client device 109 designated as "enrolled" can be permitted to access the enterprise data 138 while a client device 109 designated as "not enrolled," or having no designation, can be denied access to the enterprise data 138.

Additionally, device data 135 can include indications of the state of the client device 109. In one example, these indications can specify applications that are installed on the client device 109, configurations or settings that are applied to the client device 109, user accounts associated with the client device 109, the physical location of the client device 109, the network to which the client device 109 is connected, and other information describing the current state of the client device 109.

Further, device data 135 can also include data pertaining to organization groups. The device data 135 can include a device record associated with each client device 109. The device record(s) can include a file or table that includes the device data 135 that is associated with each client device 109. A device record format for client devices 109 that use a management platform can be different from a device record for client devices 109 that do not use the management platform.

Compliance rules 141 can include, for example, configurable criteria that must be satisfied for an enrolled one of the client devices 109 to be "in compliance" with the management service 130. The compliance rules can be based on a number of factors including geographical location of the client device 109, activation status, enrollment status, authentication data including authentication data obtained by a device registration system, time, and date, and network properties, among other factors. The compliance rules can also be determined based on a user profile associated with a user. The user profile can be identified by obtaining authentication data associated with the client device 109. The user profile can be associated with compliance rules that are further determined based on time, date, geographical location and network properties detected by the client device 109. The user profile can further be associated with an organization group, and compliance rules can be determined in view of the organization group.

Compliance rules 141 can include predefined constraints that must be met in order for the management service 130, or other applications, to permit access to the enterprise data 138 or other features of the client device 109. In some examples, the management service 130 communicates with a management application, a migration application, or another client application 175 executable on the client device 109 to determine whether states exist on the client device 109 that do not satisfy one or more compliance rules 141. Some of these states can include, for example, a virus or malware being detected on the client device 109; installation or execution of a blacklisted client application 175; a client device 109 being "rooted" or "jailbroken," where root access is provided to a user of the client device 109. Additional states can include the presence of particular files, questionable device configurations, vulnerable versions of client applications 175, or other vulnerability, as can be appreciated. In some examples, the compliance rules 141 can be configured in the management service 130 as specified by an administrator through a user interface of the management service 130.

Group data 150 can include information pertaining to various organization groups of an enterprise. An administrator can specify one or more of the client devices 109 as belonging to an organization group. Organization groups can be created by an administrator of the management service 130 so a batch of client devices 109 can be configured according to common settings. For instance, an enterprise can create respective organization groups for the marketing department and the sales department, where the client devices 109 in the marketing department are configured differently from the client devices 109 in the sales department. A group can be associated with particular management profiles, policies, applications, data formats, and other configuration details.

A organization group can be made for a set of client devices 109 that have a particular platform or operating system. For example, an enterprise can create respective organization groups for management platform devices and non-management platform devices, where the client devices 109 that use the management platform are configured differently from the client devices 109 that do not use the management platform. Multiple organization groups can be included in the group data 150. For example, the group data 150 can include an existing group 152 and a new group 154. An enterprise may desire to migrate client device(s) 109 from the existing group 152 to the new group 154 to utilize management platform features. Where the client device 109 is moved from the existing group 152 to the new group, the existing group 152 can also be referred to as a previous group 152. The new group 154 can be associated with management profiles, policies, applications, data formats, and other configuration details that can allow the utilization of management platform features, and can also be referred to as a management platform group. The new group 154 can also include management profiles, policies, applications, data formats, and other configuration details that are not related to utilization of management platform features.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system 170 that can perform functionalities and execute applications. The operating system 170 can be stored in a data store 173 that also includes client applications 175, management application 181, browser application, platform status data 184, and other data. For some client devices 109, the operating system 170 can be part of a management platform, and can be considered a management platform operating system (OS) that supports management platform features like multilayered protection, application-level security, and separation of enterprise data from personal data. For other client devices 109, the operating system 170 can be a non-management platform OS that does not support management platform features.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another.

The operating system 170 can execute various client applications 175, such as the management application 181, a browser application, or another application. The operating system 170 and some client applications 175 can access network content served up by the migration system 103, the management system 106, or other servers, thereby rendering a user interface on a display, such as a liquid crystal display (LCD), organic light emitting diode (OLED) display, touch-screen display, or other type of display device. To this end, some client applications 175 can include a browser application or a dedicated application, and a user interface can include a network page, an application screen, or other interface. The client device 109 can use the browser application that can render a user interface on the client device 109. Further, other client applications 175 can include device management applications, enterprise applications, social networking applications, word processors, spreadsheet applications, media player applications, or other applications.

The management application 181 can be an application that performs certain functions in the migration of the client device 109 to utilize management platform features. The management application 181 can perform other actions of the migration in conjunction with the management service 130. This can simplify the process for the user and the enterprise associated with the client device 109. The management application 181 can determine whether the client device 109 is a management platform device. The management application 181 can identify platform status data 184 from the client device 109. For instance, the management application 181 can search information in the data store 173 to identify system information associated with the client device 109 like a version of the operating system 170. The management application 181 can search information in the data store 173 to identify system information that can be used to identify a device identifier of the client device 109. For example, the management application 181 can search the data store 173 and identify system information such as a serial number, UDID, or other device identifier of the client device 109. The device identifier can indicate that the client device 109 is a management platform device. The management application 181 can search the data store 173 to identify system information such as an a particular client application 175 installed on the client device 109 that is associated with a management platform. The system information can be used to determine that the client device 109 supports the management platform and management platform features. The management application 181 can further search the data store 173 to identify a user identifier, a credential, an email address, or an identity of an enterprise.

Platform status data 184 can include system information associated with the client device 109 like a version of the operating system 170, a serial number, UDID, or other device identifier of the client device 109, a particular client application 175 installed on the client device 109 that is associated with a management platform, and other information. The platform status data 184 can be used to determine whether the client device 109 supports the management platform and management platform features.

Figure 2:
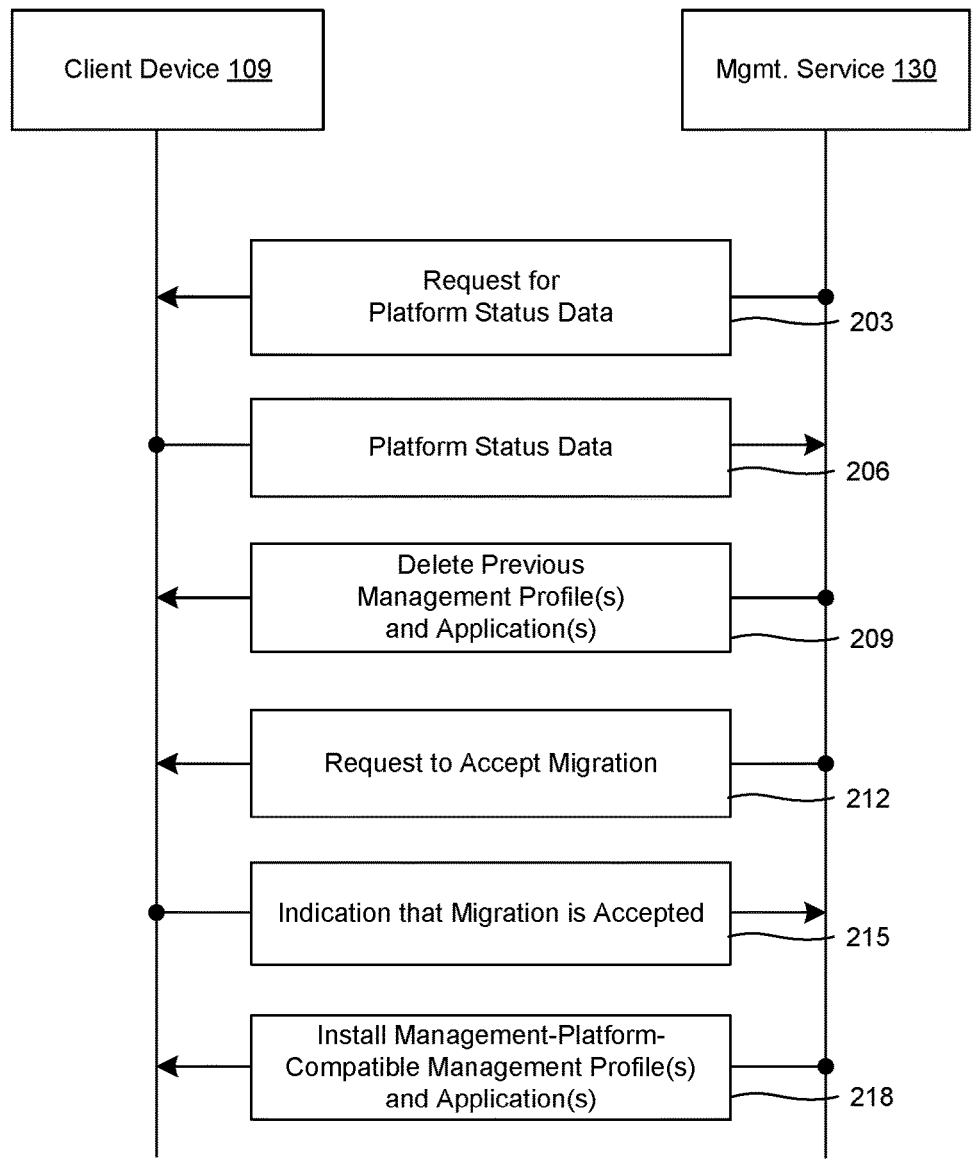
FIG. 2 is a sequence diagram illustrating functionality implemented by components of the networked environment.

Turning now to FIG. 2, shown is a sequence diagram illustrating steps performed by components of the networked environment 100 for migrating the client device 109 to utilize management platform features. Generally, the migration process shown in FIG. 2 involves identifying a management platform status of the client device 109 (i.e., whether the client device 109 is a management platform device), as well as making the necessary changes on the client device 109 and within the management service 130 to utilize management platform features. For instance, setting up an organizational group within the management service 130, and replacing a previous management profile and applications with an updated management profile and updated applications on the client device 109. The updated management profile and the updated application can be compatible with the management platform.

In step 203, the management service 130 can transmit a request for platform status data 184 to the client device 109. For instance, the management service 130 can use a notification service to request that the client device 109 check-in, and the notification service can push or otherwise route a notification to the client device 109 that causes the client device 109 to check-in with the management service 130. In other situations, the client device 109 can check in periodically or on a schedule. The management service 130 can have instructions in its command queue that cause the client device 109 to check its management platform status and transmit an indication of the management platform status to the management service 130. Once the client device 109 checks in with the management service 130, the management application 181 can implement the instructions in the command queue. For example, the command queue of the management service 130 can include a command to search the data store 173 for a version of the operating system 170, or another command to search for platform status data 184 that identifies whether the client device 109 is a management platform device. The command queue can also include a command to transmit the version of the operating system or other platform status data 184 to the management service 130. In some cases the platform status data 184 can include an indication that the client device 109 supports the management platform.

In step 206, the client device 109 can transmit the platform status data 184 to the management service 130. Once the platform status data 184 is identified from the client device 109, the management application 181 can transmit the platform status data 184 from the client device 109 to the management service 130. For example, the command queue of the management service 130 can include a command to transmit the version of the operating system 170 or other platform status data 184 to the management service 130. In some cases the management application 181 can determine that the client device 109 is compatible with the management platform, and the platform status data 184 can include an indication that the client device is compatible with the management platform.

In step 209, the management service 130 can cause the client device 109 to delete a previous management profile and previous applications that are not compatible with the management platform. Upon a check in of the client device 109 with the management service 130, the management application 181 can implement the instructions in the command queue that include a command to uninstall or delete a previous management profile on the client device 109. The previous management profile can be an existing management profile that was previously caused to be installed on the client device 109. In some cases the previous management profile can include services, features, settings or configurations that are not compatible with the management platform and a management platform feature cannot be utilized with the previous management profile in place. In some cases, the instructions in the command queue can cause incompatible management profiles to be removed while compatible management profiles are left in place on the client device 109.

In step 212, the management service 130 can transmit a request to accept migration to utilize management platform features. The request to accept migration can include a request to accept a management profile that is compatible with the management platform. For example, a command in the command queue of the management service 130 can cause the management application 181 to generate a user interface having an interface element that, when activated, obtains a user acceptance of the migration or user acceptance of the management-platform-compatible management profile (e.g., a user command that accepts the migration). The user interface can also include information about the migration, and can include an interface element that obtains user acceptance of a terms of use or other requirements. In some cases, user acceptance of migration can be obtained before causing the client device 109 to delete the previous management profile and previous applications.

In step 215, the client device 109 can transmit an indication that migration is accepted. For example, once the management application 181 obtains user acceptance of the migration, the management application 181 can transmit an indication of the user acceptance to the management service 130. The indication that migration is accepted can include an indication that the management-platform-compatible management profile is accepted. In some examples, the indication that migration is accepted can further include an indication that a terms of use and other requirements are accepted. A management platform account can be created in association with a management platform service 190. The management platform account can be associated with the client device 109 within the management platform service 190 using a device identifier. The management platform account can also be associated with a user of the client device 109 using a user identifier. The management service 130 can also create a new device record for the client device 109 within the management service 130, and delete a previous device record for the client device 109. The new device record can use a format that is associated with or compatible with the management platform. The new device record can also include a parameter that indicates that the client device 109 is migrated within the management service 130 to utilize the management platform.

In step 218 the management service 130 can cause the client device 109 to install management-platform-compatible management profiles and applications. The client device 109 can check in with the management service 130 and retrieve a command from the command queue that causes the client device 109 to install a management-platform-compatible management profile. The management-platform-compatible management profile can include a set of attributes, features, services, configurations, and settings that are compatible with the management platform and enable the management platform features. The command queue can also include a command that causes the client device 109 to install a management platform application that is compatible with the management platform and enables a management platform feature.

Figure 3:
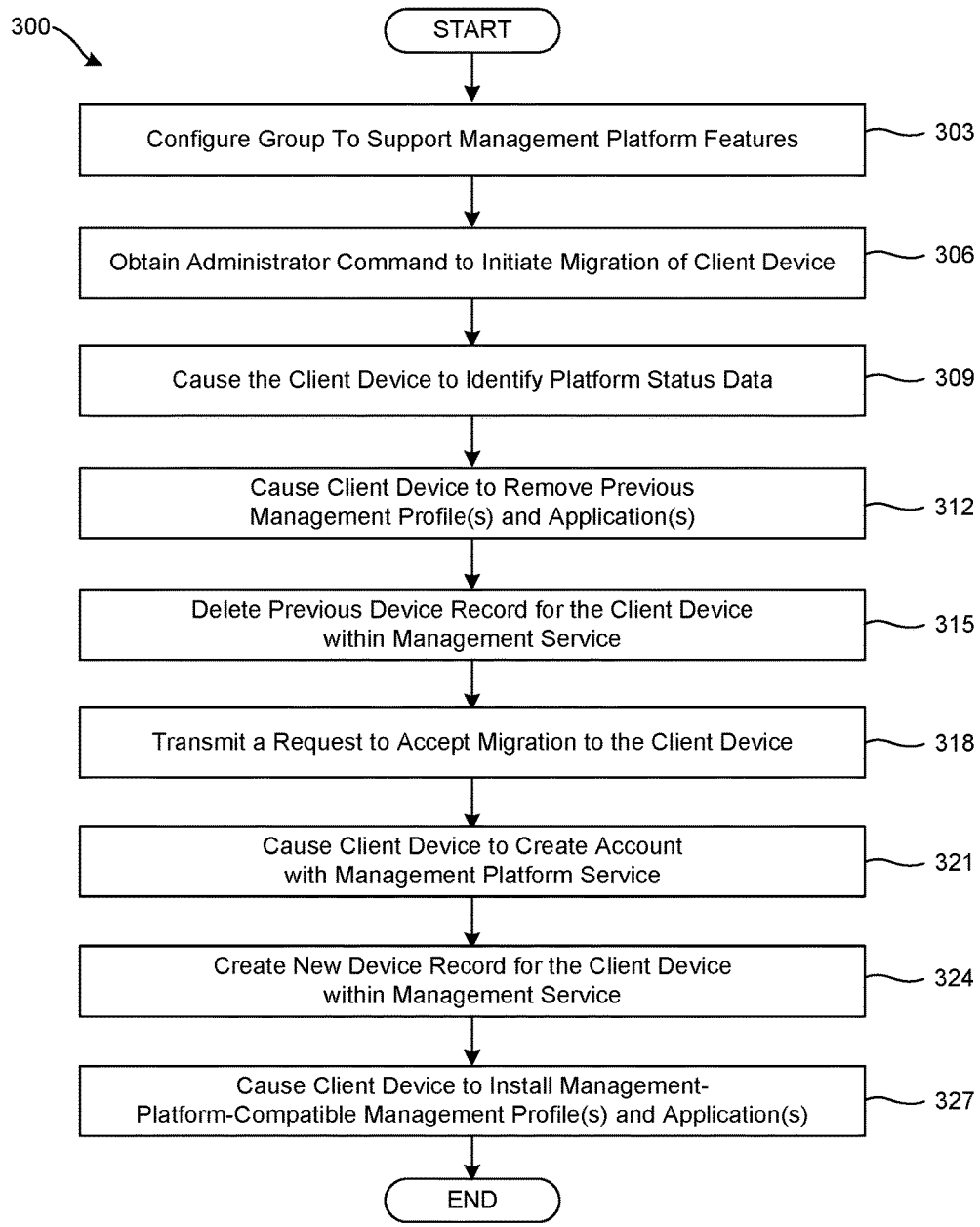
FIGS. 3-4 are flowcharts illustrating functionality implemented by components of the networked environment.

FIG. 3 shows a flowchart 300 that illustrates an example of the operation of the management service 130 for migrating the client device 109 to utilize management platform features. Generally, the migration process involves making the necessary changes on the client device 109 and within the management service 130 to utilize management platform features. For instance, setting up an organizational group within the management service 130, and causing the client device 109 to replace a previous management profile and previous applications with a management profile and applications that are compatible with the management platform.

In step 303, the management service 130 can configure an organizational group to support or be compatible with management platform features. The management service 130 can provide a console or interface through an application, web application, and/or network site for administration of the migration of client devices 109 within the management service 130 to utilize management platform features. The console can be utilized to create a new group 154 to be a management platform group within the management service 130 that is compatible with management platform features. The console can also be used to configure an existing group 152 within the organizational group to be a management platform group that is compatible with management platform features.

The management platform group can use formats, settings, and configurations that are compatible with management platform features, and can be associated with management profiles and applications that are compatible with management platform features. A client device 109 can be associated with the management platform group within the management service 130, and the management service 130 can cause the management profiles and applications that are compatible with management platform features to be installed on the client device 109. Configuring the management platform group can also include uploading or otherwise applying a certificate 156 that authenticates the management service 130 with a management platform service 190 to allow the management service 130 to enable or support management platform features for client devices 109 in the management platform group. The console of the management service 130 can include an interface element that allows an administrator to upload or apply the certificate 156.

In step 306, the management service 130 can obtain an administrator command to initiate migration of the client device 109. The management service 130 can generate a console or user interface having a button or interface element that initiates migration of client device 109 when activated. For instance, an enterprise can desire to utilize GOOGLE® Android enterprise features for client devices 109 that use Android enterprise. To this end, an administrator can utilize the console of the management service to create the new group 154 that uses a device record format that is compatible with GOOGLE® Android enterprise. The new group 154 can also be associated with management profiles and applications that are compatible with GOOGLE® Android enterprise. The new group 154 can be unrelated to the existing group 152, or can be a sub-group such as a sibling group or a child group of the existing group 152. The administrator can utilize the console to upload a certificate 156 that authenticates the management service 130 with a GOOGLE® Android management platform service 190 to allow the management service 130 to enable Android enterprise features. The administrator can activate an interface element of a console generated by the management service 130 to initiate migration of client device(s) 109 to the new group 154. In some cases, this can include initiating the migration instructions 131 to automatically perform the migration process.

In another example, an administrator can utilize the console of the management service 130 to configure the existing group 152 to use formats, settings, and configurations that are compatible with a particular management platform. The administrator can configure the existing group 152 to be associated with management profiles and applications that are compatible with the particular management platform. The administrator can utilize the console to upload a certificate 156 that authenticates the management service 130 with a management platform service 190 to allow the management service 130 to enable management platform features. The administrator can activate an interface element of a console generated by the management service 130 to initiate migration of client device(s) 109 within the existing group 152 to utilize management platform features. In some cases, this can include initiating the migration instructions 131 to automatically perform the migration process.

The console of the management service 130 can display a list of client devices 109. The console can allow an administrator to select a subset of the client devices 109 to migrate, or can migrate all client devices 109, or all client devices 109 in an organizational group. In some cases, the management service 130 can migrate client devices 109 that are management platform devices 109, based on a flag, parameter, or other platform status data 184 associated with each client device 109 in the device data 135. In some situations, platform status data 184 associated with each client device 109 can be unknown before initiating the migration.

In step 309, the management service 130 can cause the client device 109 to identify platform status data 184 from the client device 109. For example, the management service 130 can have a command in its command queue that causes the client device 109 to identify platform status data 184. The client device 109 can check in with the management service 130, and the management application 181 can retrieve a command to identify system information of the client device 109. The management application 181 can search the data store 173 and identify system information like a device identifier of the client device 109, a client application 175 installed on the client device 109, or a version of the operating system 170. The system information can be used to determine whether the client device 109 is compatible with the management platform. The management service 130 can receive an indication that the client device is compatible with the management platform or other platform status data 184 from the client device 109.

In step 312, the management service 130 can cause the client device 109 to remove a previous management profile and previous applications. For example, the management service 130 can have a command in its command queue that causes the management application 181 to uninstall a previous management profile (e.g., an existing management profile) from the client device 109. The previous management profile can be one that is not compatible with the management platform. In some situations, the previous management profile is not removed, or the previous management profile can be removed at another point in the migration process.

In step 315, the management service 130 can delete a previous device record within the management service 130. A previous or existing device record can include device data 135 that is associated with the client device 109. The previous device record can include a configuration of the client device 109, a device identifier of the client device 109, data pertaining to a user of each client device 109, an enrollment status of the client device 109, and other device data 135. The management service 130 can save device data 135 that is associated with the client device 109 in a temporary record in the data store 127. This data can be used to create a new device record having device data 135 that is associated with the client device 109.

In step 318, the management service 130 can transmit a request to accept migration to the client device 109. The request to accept migration can include a request to accept a management-platform-compatible management profile, or a request to set up a management-platform-compatible management profile. The management service 130 can have a command in its command queue. The management application can retrieve the command on check in, and the command can cause the management application 181 to generate a prompt or user interface element that when activated obtains a user acceptance of the migration. The management service 130 can transmit a notification that causes the management application 181 to check in and/or generate the prompt to accept migration. In some cases, the management service 130 can utilize a notification service to push or otherwise route the notification to the client device 109. The user interface can also include information about the migration, and can include an interface element that obtains user acceptance of a terms of use or other requirements. In some cases, user acceptance of migration can be obtained before causing the client device 109 to delete the previous management profile(s) and applications. The management service 130 can receive an indication of the user acceptance of the migration from the client device 109.

In step 321, the management service 130 can cause the client device 109 to create an account with a management platform service 190. In some cases, the management application 181 can cause the client device 109 to create the account with a management platform service 190 automatically once user acceptance of the management-platform-compatible management profile is obtained. The management service 130 can have in its command queue a command to create the account with a management platform service 190. The management application 181 can retrieve the command on check in, and cause the client device 109 to create an account with a management platform service 190. Account information can be transmitted to and received by the management service 130. The account information can include an account name, credentials, user identifier, device identifier, and other information associated with the account with the management platform service 190.

In step 324, the management service 130 can create a new device record for the client device 109 within the management service 130. The new device record can include device data 135 associated with the client device 109. The new device record can use a format that is associated with or compatible with the management platform. The new device record can also include a parameter that indicates that the client device 109 is migrated within the management service 130 to utilize the management platform. The new device record can further include an account name, credentials, user identifier, device identifier, and other account information associated with the account with the management platform service 190.

In step 327, the management service 130 can cause the client device 109 to install management-platform-compatible management profiles and applications. The management service 130 can have a command in its command queue. The management application 181 can execute the command, causing the client device 109 to install the management-platform-compatible management profile. In some cases, the command can include a URI through which the management-platform-compatible management profile can be obtained. The management-platform-compatible management profile can include a set of attributes, features, services, configurations, and settings that are compatible with the management platform and enable the management platform features. The command queue can also include commands that cause the client device 109 to download and install a management platform application that is compatible with the management platform and enables a management platform feature.

Figure 4:
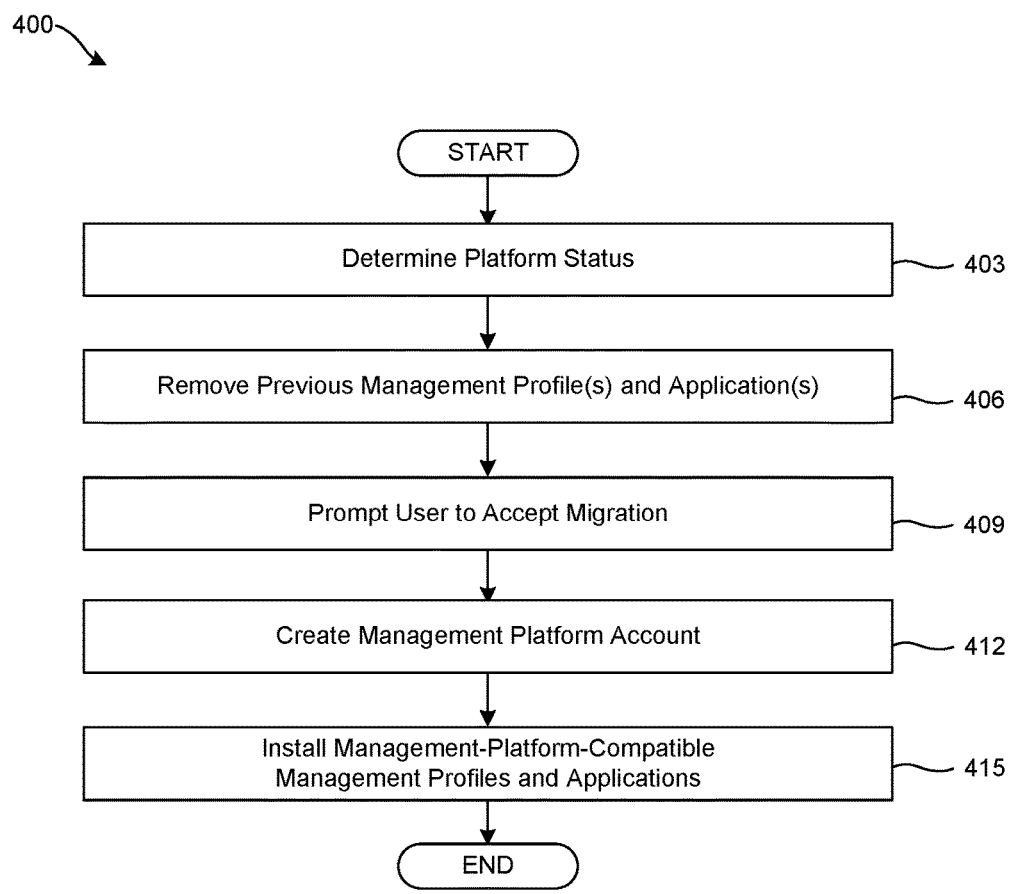

FIG. 4 shows a flowchart 400 that illustrates an example of the operation of the management application 181 in conjunction with the management service 130 to migrate the client device 109 to utilize management platform features. Generally, the management application 181 can implement actions on the client device 109 to make necessary changes and provide information to the management service 130 in order to utilize management platform features.

In step 403, the management application 181 can determine platform status data 184 associated with the client device 109. The client device 109 can check in with the management service 130 and can retrieve a command to determine platform status data 184 associated with the client device 109. The management application 181 can search the data store 173 and identify system information such as a device identifier of the client device 109, a client application 175 installed on the client device 109, or a version of the operating system 170. The system information can be used to determine whether the client device 109 is compatible with the management platform. The management application 181 can transmit an indication that the client device is compatible with the management platform or other platform status data 184 to the management service 130.

In step 406, the management application 181 can remove previous management profiles and applications from the client device 109. The management application 181 can and retrieve a command from the command queue of the management service 130 that can cause the management application 181 to uninstall a previous management profile from the client device 109. The previous management profile can be one that is not compatible with the management platform or is not compatible with a management platform feature. In some situations, the previous management profile is not removed, or the previous management profile can be removed at another point in the migration process.

In step 409, the management application 181 can prompt the user to accept migration. The management application 181 can retrieve a command from the command queue of the management service 130 that can cause the management application 181 to generate a prompt or user interface element that when activated obtains a user acceptance of the migration (e.g., a user command that accepts the migration). The management application 181 can receive a notification that causes the management application 181 to check in and/or generate the prompt to accept the migration. The user interface can also include information about the migration, and can include an interface element that obtains user acceptance of a terms of use or other requirements. In some cases, user acceptance of migration can be obtained before causing the client device 109 to delete the previous management profiles and applications. Once the user acceptance of the migration is obtained, the management application 181 can transmit an indication that migration is accepted to the management service 130.

In step 412, the management application 181 can create an account with the management platform service 190. The account can be referred to as a management platform account. The command queue of the management service 130 can include a command to create the account with the management platform service 190. The management application 181 can retrieve the command and implement it on the client device 109 by creating the account with a management platform service 190. The account can be unique to the client device 109 and a user of the client device 109. The management application 181 can transmit account information for the account to the management service 130. The account information can include an account name, credentials, user identifier, device identifier, and other information associated with the account with the management platform service 190. The indication that migration is accepted can be transmitted before, after, or along with the account information.

In step 415, the management application 181 can install management-platform-compatible management profiles and applications. The management service 130 can have a command in its command queue. The management application 181 can retrieve and execute the command. The management application 181 can cause the client device 109 to obtain and install the management-platform-compatible management profile. In some cases, the command can include a URI through which the management-platform-compatible management profile can be downloaded. The management-platform-compatible management profile can include a set of attributes, features, services, configurations, and settings that are compatible with the management platform and enable the management platform features. The management application 181 can retrieve and execute commands to download and install a management platform application that is compatible with the management platform and enables a management platform feature.

Figure 5:
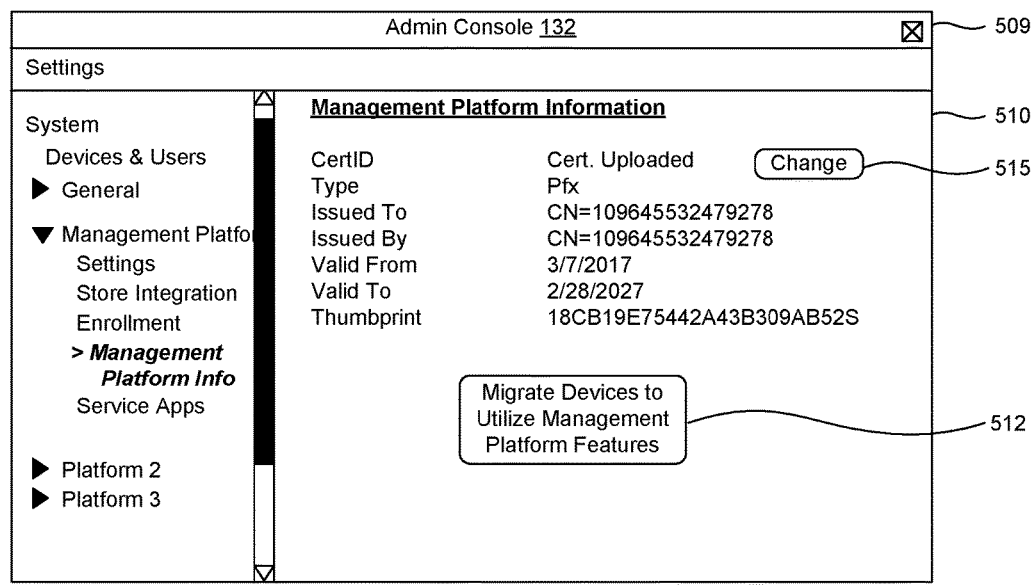
FIG. 5 is a drawing illustrating functionality generated by the management system and implemented by components of the networked environment.

With reference to FIG. 5, shown is an example illustration of the administrative console 132 executed in a computing device to render a user interface 509. The user interface 509 of the administrative console 132 can be accessed through an application, web application, and/or network site. The user interface 509 includes a management platform information pane 510. The management platform information pane 510 can include information including "CertID" information. The "CertID" information can include a certificate 156 that authenticates the management service 130 with the management platform service 190. The user interface 509 can include a button or interface element 515 through which the certificate 156 can be uploaded, updated, or changed. The management platform information pane 510 can include information regarding a type of the certificate. Here, the management platform information pane 510 can show that the certificate 156 is a Pfx certificate having a *.pfx file extension. The certificate 156 can have a *.ca-bundle, *.cer, *.crt, *.der, *.p7b, *.p7s, *.pem, or another file extension. In some cases the certificate 156 can contain one or more X.509 digital certificate files.

The management platform information pane 510 can include "Issued To" information including an identifier that indicates an entity to which the certificate is issued. "Issued By" information can include an identifier that indicates an entity from which the certificate is issued. The management platform information pane 510 can further include "Valid From" information like a date or a time that the enterprise management platform features are enabled or will be enabled. "Valid To" information can include a date or time that the enterprise management platform features expired or will expire. The management platform information pane 510 can include a certificate thumbprint that uniquely identifies the certificate 156. The certificate thumbprint can include a hexadecimal string or another character string.

The management platform information pane 510 of the user interface 509 can also include a button or interface element 512 through which a user can generate a command to initiate migration of client devices 109. The interface element 512 is shown stating "Migrate Devices to Utilize Management platform Features." When activated, the interface element 512 can initiate migration of the client devices 109 to utilize management platform features. This can cause the management system 106 to execute migration instructions 131 or another process of the management service 130.

Figures 6A, 6B:
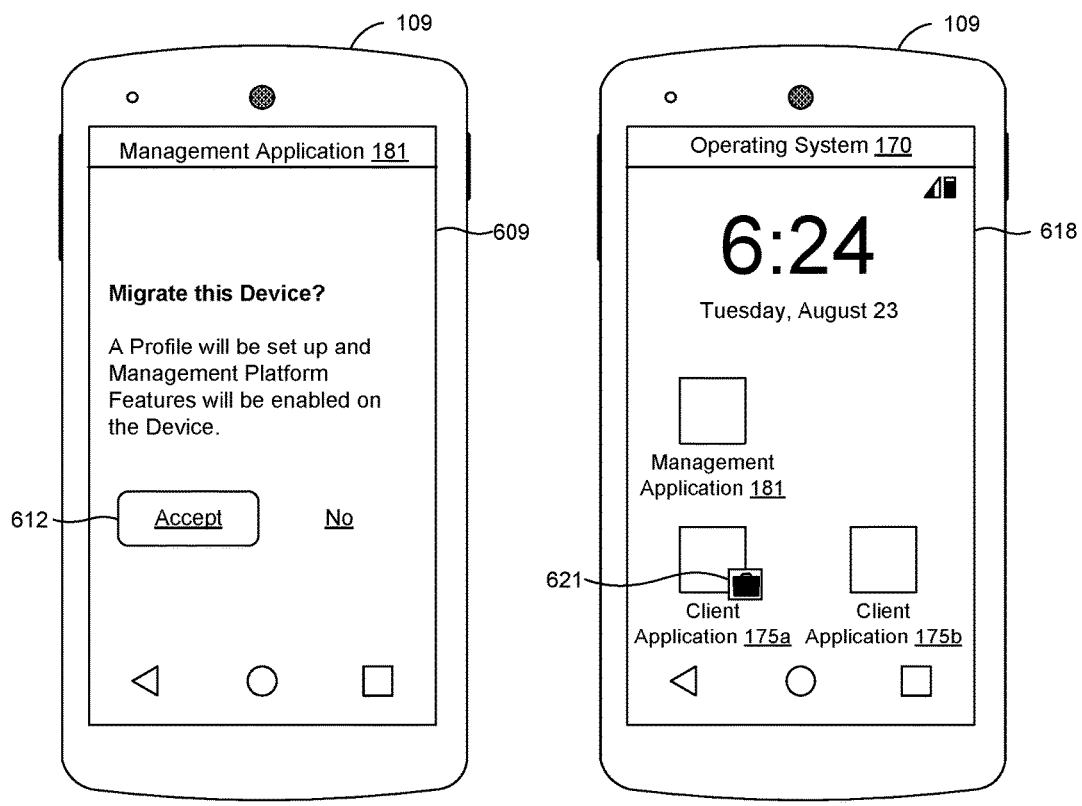
FIGS. 6A-B are drawings illustrating functionality rendered on the client device and implemented by components of the networked environment.

FIG. 6A shows an example illustration of a client device 109 executing a management application 181 to render a user interface 609. The user interface 609 can include a message prompting a user to accept migration of the client device 109. As shown, the message can state "Migrate this Device? A Profile will be set up and Management platform Features will be enabled on the Device." The user interface 609 can include a button or interface element 612 that, when activated, obtains a user acceptance of the migration. Activating the interface element 612 can also cause the management application 181 to transmit an indication that the migration is accepted to the management service 130.

FIG. 6B shows an example illustration of the client device 109 executing an operating system 170. The operating system 170 is rendering a user interface 618 that includes the management application 181, as well as client application 175a and client application 175b of the client applications 175. An icon of the client application 175a can include an icon indicator 621. The icon indicator 621 can identify that the client application 175a is compatible with a management platform or a management platform feature. The management application 181 can cause the client device 109 to download and install the client application 175a during the migration process. The client application 175b can be an application that is not associated with the management platform.

The client devices 109 or devices comprising the migration system 103, the management system 106, and the management platform system 108 can include at least one processor circuit, for example, having a processor and at least one memory device, both of which couple to a local interface, respectively. The device can include, for example, at least one computer, a mobile device, smartphone, computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by the client application 175 or another application can be rendered. In some examples, the user interface can be generated with user interface data provided by the management service 130. The client device 109 can also include one or more input/output devices that can include, for example, a capacitive touchscreen or other type of touch input device, fingerprint reader, or keyboard.

Although the management service 130, client applications 175, management application 181, and other various services and functions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device; and
   a management service executable in the at least one computing device that, when executed, causes the at least one computing device to:
   generate a user interface that obtains a command to initiate migration of a client device to utilize at least one management platform feature of a management platform, the client device being enrolled with the management service;
   cause the client device to identify status data in a data store of the client device, wherein the status data comprises system information that indicates that the client device is compatible with the management platform;
   receive the status data from the client device;
   transmit a request to accept migration to the client device, wherein the request to accept migration causes the client device to generate a prompt to accept a management profile that is compatible with the management platform;
   receive an indication that migration is accepted from the client device;
   cause the client device to uninstall a previous management profile;
   create a device record for the client device, wherein a format of the device record is compatible with the management platform; and
   cause the client device to install the management profile that is compatible with the management platform.

2. The system of claim 1, wherein when executed the management service further causes the at least one computing device to cause the client device to install an application that is compatible with the management platform.

3. The system of claim 1, wherein when executed the management service further causes the at least one computing device to cause the client device to uninstall an application that is not compatible with the management platform.

4. The system of claim 1, wherein the management service utilizes a certificate to authenticate the management service with a management platform service of the management platform.

5. The system of claim 1, wherein when executed the management service further causes the at least one computing device to delete a previous device record of the client device, wherein the previous device record has another format that is different from the format of the device record that is compatible with the management platform.

6. The system of claim 1, wherein when executed the management service further causes the at least one computing device to cause the client device to create an account with a management platform service of the management platform.

7. The system of claim 1, wherein the status data comprises a version of an operating system of the client device, wherein the version of the operating system is compatible with the at least one management platform feature of the management platform.

8. A computer-implemented method, comprising:
generating a user interface that obtains a command to initiate migration of a client device to utilize at least one management platform feature of a management platform, the client device being enrolled with a management service;
causing the client device to identify status data in a data store of the client device, wherein the status data comprises system information that indicates that the client device is compatible with the management platform;
receiving the status data from the client device;
transmitting a request to accept migration to the client device, wherein the request to accept migration causes the client device to generate a prompt to accept a management profile that is compatible with the management platform;
receiving an indication that migration is accepted from the client device;
causing the client device to uninstall a previous management profile;
creating a device record for the client device, wherein a format of the device record is compatible with the management platform; and
causing the client device to install the management profile that is compatible with the management platform.

9. The computer-implemented method of claim 8, further comprising causing the client device to install an application that is compatible with the management platform.

10. The computer-implemented method of claim 8, further comprising causing the client device to uninstall an application that is not compatible with the management platform.

11. The computer-implemented method of claim 8, wherein the management service utilizes a certificate to authenticate the management service with a management platform service of the management platform.

12. The computer-implemented method of claim 8, further comprising deleting a previous device record of the client device, wherein the previous device record has another format that is different from the format of the device record that is compatible with the management platform.

13. The computer-implemented method of claim 8, further comprising causing the client device to create an account with a management platform service of the management platform.

14. The computer-implemented method of claim 8, wherein the status data comprises a version of an operating system of the client device, wherein the version of the operating system is compatible with the at least one management platform feature of the management platform.

15. A non-transitory computer-readable medium embodying a management service executable in a client device that, when executed, causes the client device to:

generate a user interface that obtains a command to initiate migration of a client device to utilize at least one management platform feature of a management platform, the client device being enrolled with the management service;
cause the client device to identify status data in a data store of the client device, wherein the status data comprises system information that indicates that the client device is compatible with the management platform;
receive the status data from the client device;
transmit a request to accept migration to the client device, wherein the request to accept migration causes the client device to generate a prompt to accept a management profile that is compatible with the management platform;
receive an indication that migration is accepted from the client device;
cause the client device to uninstall a previous management profile;
create a device record for the client device, wherein a format of the device record is compatible with the management platform; and
cause the client device to install the management profile that is compatible with the management platform.

16. The non-transitory computer-readable medium of claim 15, wherein when executed the management service further causes the at least one computing device to cause the client device to install an application that is compatible with the management platform.

17. The non-transitory computer-readable medium of claim 15, wherein when executed the management service further causes the at least one computing device to cause the client device to uninstall an application that is not compatible with the management platform.

18. The non-transitory computer-readable medium of claim 15, wherein the management service utilizes a certificate to authenticate the management service with a management platform service of the management platform.

19. The non-transitory computer-readable medium of claim 15, wherein when executed the management service further causes the at least one computing device to delete a previous device record of the client device, wherein the previous device record has another format that is different from the format of the device record that is compatible with the management platform.

20. The non-transitory computer-readable medium of claim 15, wherein when executed the management service further causes the at least one computing device to cause the client device to create an account with a management platform service of the management platform.

* * * * *